US007611243B2

(12) United States Patent
Takeichi

(10) Patent No.: US 7,611,243 B2
(45) Date of Patent: Nov. 3, 2009

(54) EYEGLASS LENS PROCESSING METHOD

(75) Inventor: Kyoji Takeichi, Gamagori (JP)

(73) Assignee: Nidek Co., Ltd., Aichi (JP)

( * ) Notice: Subject to any disclaimer, the term of this patent is extended or adjusted under 35 U.S.C. 154(b) by 269 days.

(21) Appl. No.: 11/831,510

(22) Filed: Jul. 31, 2007

(65) Prior Publication Data

US 2008/0218690 A1 Sep. 11, 2008

(30) Foreign Application Priority Data

Jul. 31, 2006 (JP) ............................ 2006-209296

(51) Int. Cl.
*G02C 13/00* (2006.01)

(52) U.S. Cl. ...................................... 351/178; 351/110

(58) Field of Classification Search .................. 351/41, 351/110, 178; 451/42, 48
See application file for complete search history.

(56) References Cited

U.S. PATENT DOCUMENTS 5,333,412 A 8/1994 Matsuyama
6,478,657 B1 11/2002 Shibata
6,790,124 B2 9/2004 Shibata
7,384,326 B2 * 6/2008 Yamamoto et al. ............ 451/6
2007/0201002 A1 * 8/2007 Takeichi .................... 351/178

FOREIGN PATENT DOCUMENTS

EP 1676683 A1 7/2006
EP 1679153 A1 7/2006
EP 1825982 A1 8/2007
FR 2800172 A1 4/2001
FR 2863189 A1 6/2005
JP 2003-145328 A 5/2003

* cited by examiner

*Primary Examiner*—Huy K Mai
(74) *Attorney, Agent, or Firm*—Sughrue Mion, PLLC

(57) ABSTRACT

An eyeglass lens processing method for processing a hole for attaching a rimless frame to an eyeglass lens, the method includes: selecting a pattern used for a processing from a plurality of hole patterns; selecting a first drilling in which an angle of the processed hole is normal at least to a lens surface of a demo lens or a second drilling in which the angle of the processed hole is normal to a lens surface of the eyeglass lens; and when the first drilling is selected, (a) inputting a surface curve of the demo lens, (b) inputting hole position data of the demo lens for the selected pattern, (c) determining an hole angle and a hole position for the eyeglass lens based on the surface curve of the demo lens and the hole position data to obtain drilling data.

3 Claims, 12 Drawing Sheets

EYEGLASS LENS PROCESSING METHOD

BACKGROUND OF THE INVENTION

The present invention relates to an eyeglass lens processing method for processing a hole for attaching a rimless frame to an eyeglass lens.

There is known an eyeglass lens processing method for inputting data of a position of a hole or the like for attaching a rimless frame to an eyeglass lens and automatically drilling by a numerical control (refer to, for example, JP-A-2003-145328). In the drilling, as a method of setting an angle of the hole (direction of the hole), there are a method of arbitrarily setting the angle and a method of setting the angle in a normal line direction relative to an angle of inclination of a front surface of the lens.

Meanwhile, in an eyeglass store, a fitting operation is carried out for a wearer by using a rimless frame integrated with a demo lens. Further, an opening angle of a temple or the like is adjusted in accordance with a shape of the head portion of the wearer. Thereafter, a prescribed lens is subjected to a peripheral edge processing and a drilling and the processed lens is integrated to the rimless frame.

At this occasion, in the rimless frame, the lens serves as the frame. Therefore, when a surface curve of the demo lens differs from that of the actually attached lens, according to the method of setting the angle of the hole in the normal line direction of the front surface of the lens, a degree of fitting an end piece of the frame and the opening angle of the temple are changed. Therefore, it is necessary for an operator to set the angle of the hole in consideration of a relationship among the surface curves of the demo lens and the processed lens, the position of the hole and the like. However, a skill and an experience are needed therefor, it is not easy to pertinently process the hole. Particularly, in a case of a rimless frame having a turning preventive contact at an end surface of the lens, it is not easy to set the direction of the position of the hole. Therefore, it is difficult to adjust the degree of fitting an endpiece of the frame and the opening angle of the temple.

SUMMARY OF THE INVENTION

It is a technical problem of the invention to provide an eyeglass lens processing method capable of pertinently setting an angle of a hole or the like for a rimless frame and capable of pertinently processing the hole without requiring a skill.

In order to resolve the above-described problem, the invention is characterized in providing the following constitution.

(1) An eyeglass lens processing method for processing a hole for attaching a rimless frame to an eyeglass lens, the method comprising:

selecting a hole pattern used for a processing from a plurality of hole patterns;

selecting a first drilling in which an angle of the processed hole is normal to a lens surface of a demo lens, a second drilling in which the angle of the processed hole is normal to a lens surface of the eyeglass lens or a third drilling in which the angle of the processed hole is arbitrarily set to the lens surface of the eyeglass lens;

when the first drilling is selected, (a) inputting a surface curve of the demo lens or an angle of inclination, which is approximated to the surface curve of the demo lens, at a hole position, (b) inputting hole position data of the demo lens for the selected hole pattern, (c) determining an hole angle and a hole position for the eyeglass lens based on the surface curve or the angle of the inclination and the hole position data to obtain drilling data; and performing drilling on the eyeglass lens based on the drilling data.

(2) The method according to (1), wherein the hole position data inputting step includes a step of inputting a surface curve of the eyeglass lens or an angle of inclination, which is approximated to the surface curve of the eyeglass lens, at a hole position, and the determining step includes a step of correcting the hole position data to obtain a hole position correction data when the demo lens differs from the eyeglass lens in the surface curve or the angle of the inclination.

(3) The method according to (1), wherein the hole position data inputting step includes steps of taking an image of the demo lens and obtaining the hole position based on the taken image.

(4) An eyeglass lens processing apparatus for processing a hole for attaching a rimless frame to an eyeglass lens, comprising:

a display for displaying a plurality of hole patterns;

pattern selecting means for selecting a hole pattern used for a processing from the plurality of hole patterns displayed on the display;

hole angle selecting means for selecting a first drilling in which an angle of the processed hole is normal to a lens surface of a demo lens, a second drilling in which the angle of the processed hole is normal to a lens surface of the eyeglass lens or a third drilling in which the angle of the processed hole is arbitrarily set to the lens surface of the eyeglass lens;

surface curve inputting means for inputting a surface curve of the demo lens or an angle of inclination, which is approximated to the surface curve of the demo lens, at a hole position;

hole position data inputting means for inputting hole position data of the demo lens for the selected hole pattern; and drilling data obtaining means for determining an hole angle and a hole position for the eyeglass lens based on the surface curve or the angle of the inclination and the hole position data to obtain drilling data, wherein the surface curve inputting means, the hole position data inputting means and the drilling data obtaining means are activated when the hole angle selecting means selects the first drilling.

(5) The eyeglass lens processing apparatus according to (4), wherein the hole position data inputting means includes inputting means for inputting a surface curve of the eyeglass lens or an angle of inclination, which is approximated to the surface curve of the eyeglass lens, at a hole position, and the drilling data obtaining means corrects the hole position data to obtain a hole position correction data when the demo lens differs from the eyeglass lens in the surface curve or the angle of the inclination.

DESCRIPTION OF THE PREFERRED EMBODIMENTS

Figure 1:
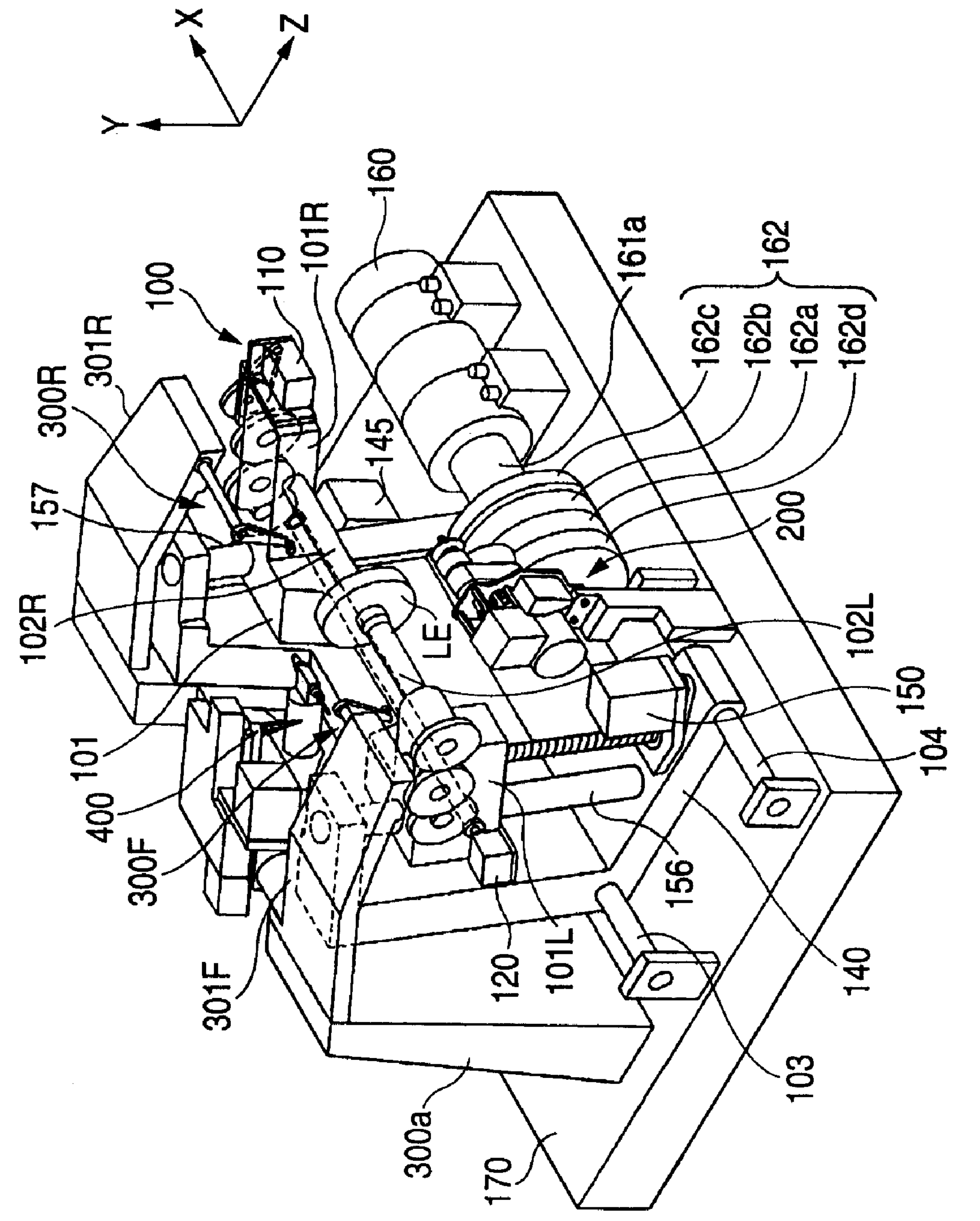
FIG. 1 is an outline constitution view of a processing portion of an eyeglass lens processing apparatus.

An embodiment of the invention will be explained with reference to the drawings as follows. FIG. 1 is an outline constitution view of a processing portion of an eyeglass lens processing apparatus using the invention.

A carriage portion 100 including a carriage 101 and a moving mechanism thereof is mounted on a base 170. A processed lens LE is rotated by held (chucked) by lens chucks 102L and 102R rotatably held by the carriage 101, and is ground by a grindstone 162 constituting a processing piece attached to a grindstone spindle 161 rotated by a grindstone rotating motor 160 fixed onto the base 170. The grindstone 162 according to the embodiment includes a roughing grindstone 162*a*, a bevel-finishing and flat-finishing grindstone 162*b*, a bevel-polishing and flat-polishing grindstone 162*c*, and a roughing grindstone 162*d* for a glass lens. The grindstones 162*a* through 162*d* are coaxially attached to the grindstone spindle 161.

The lens chucks 102L and 102R are held by the carriage 101 such that center axes thereof (rotational center axis of lens LE) is in parallel with a center axis of the grindstone spindle 161 (rotational axis of grindstone 162). The carriage 101 is movable in a direction of the center axis of the grindstone spindle 161 (direction of center axes of lens chucks 102L and 102R) (X axis direction), and movable in a direction orthogonal to the X axis direction (direction of changing distance between center axes of lens chucks 102L and 102R and center axis of grindstone spindle 161) (Y axis direction).

The lens chuck 102L is held by a left arm 101L of the carriage 101 and the lens chuck 102R is held by a right arm 101R of the carriage 101 rotatably and coaxially. The right arm 101R is fixed with a lens holding (chucking) motor 110 and the lens chuck 102R is moved in a direction of the center axis by rotating the motor 110. Thereby, the lens chuck 102R is moved in a direction of being proximate to the lens chuck 102L, and the lens LE is held (chucked) by the lens chucks 102L and 102R. Further, the left arm 101L is fixed with a lens rotating motor 120, the lens chucks 102L and 102R are rotated in synchronism with each other by rotating the motor 120 to rotate the lens LE held (chucked) thereby.

A moving support base 140 is movably supported by guide shafts 103 and 104 fixed in parallel on the base 170 and extended in the X axis direction. Further, an X axis direction moving motor 145 is fixed on the base 170, the support base 140 is moved in the X axis direction by rotating the motor 145, and the carriage supported by the guide shafts 156 and 157 fixed to the support base 140 is moved in the X axis direction.

The carriage 101 is movably supported by the guide shafts 156 and 157 fixed in parallel to the support base 140 and extended in the Y axis direction. Further, the support base 140 is fixed with a Y axis direction moving motor 150, and the carriage 101 is moved in the Y axis direction by rotating the motor 150.

Figure 2:
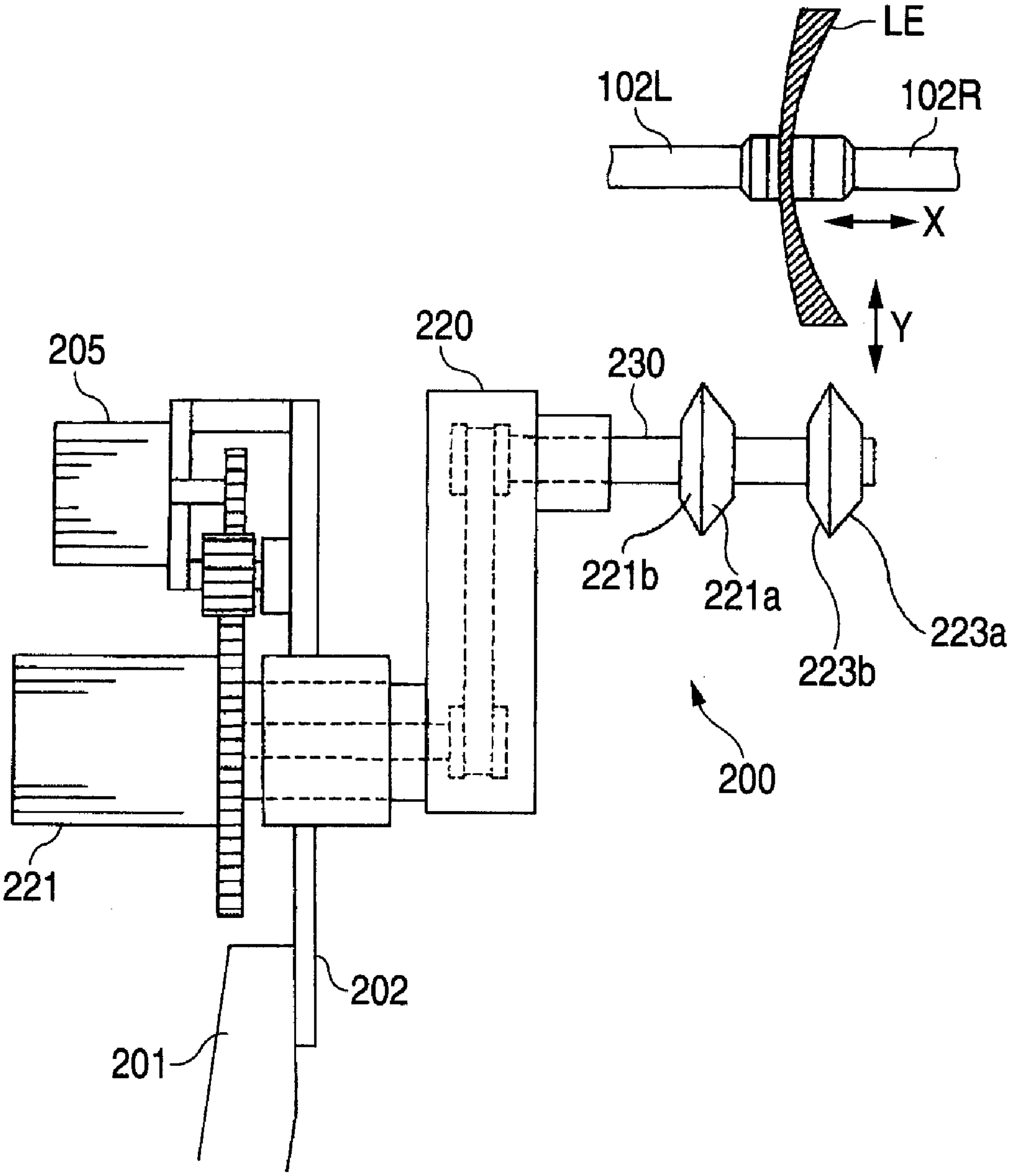
FIG. 2 is an explanatory view of a constitution of a chamfering mechanism portion.

A chamfering portion 200 is arranged on this side of the carriage 100. FIG. 2 is an outline constitution view of the chamfering portion 200. An arm 220 is rotatably held by a plate 202 fixed to a fixed support base 201 on the base 170. A grindstone spindle 230 rotatably held by the arm 220 is coaxially attached with a finish-chamfering grindstone 221*a* for a front refracting surface (hereinafter, front surface) of the lens LE, a finish-chamfering grindstone 221*b* for a rear refracting surface (hereinafter, rear surface) of the lens LE, a polish-chamfering grindstone 223*a* for the front surface of the lens LE, and a polish-chamfering grindstone 223*b* for the rear surface of the lens LE. The grindstones 221*a*, 221*b*, 223*a* and 223*b* are provided with the same diameter, respective processing surfaces of the grindstones 221*a* and 223*a* are provided with the same angle of inclination, and also respective processing surfaces of the grindstones 221*b* and 223*b* are provided with the same angle of inclination. Further, the plate 202 is fixed with a grindstone moving motor 205, the arm 220 is rotated by rotating the motor 205, and the grindstone spindle 230 is moved between an escaping position and a processing position. The processing position of the grindstone spindle 230 is a position on a plane between the lens chucks 102R and 102L and the grindstone spindle 161 at which the center axes of the both are disposed. Further, the arm 220 is fixed with a grindstone rotating motor 221 and the grindstone spindle 230 is rotated by rotating the motor 221.

Figure 3:
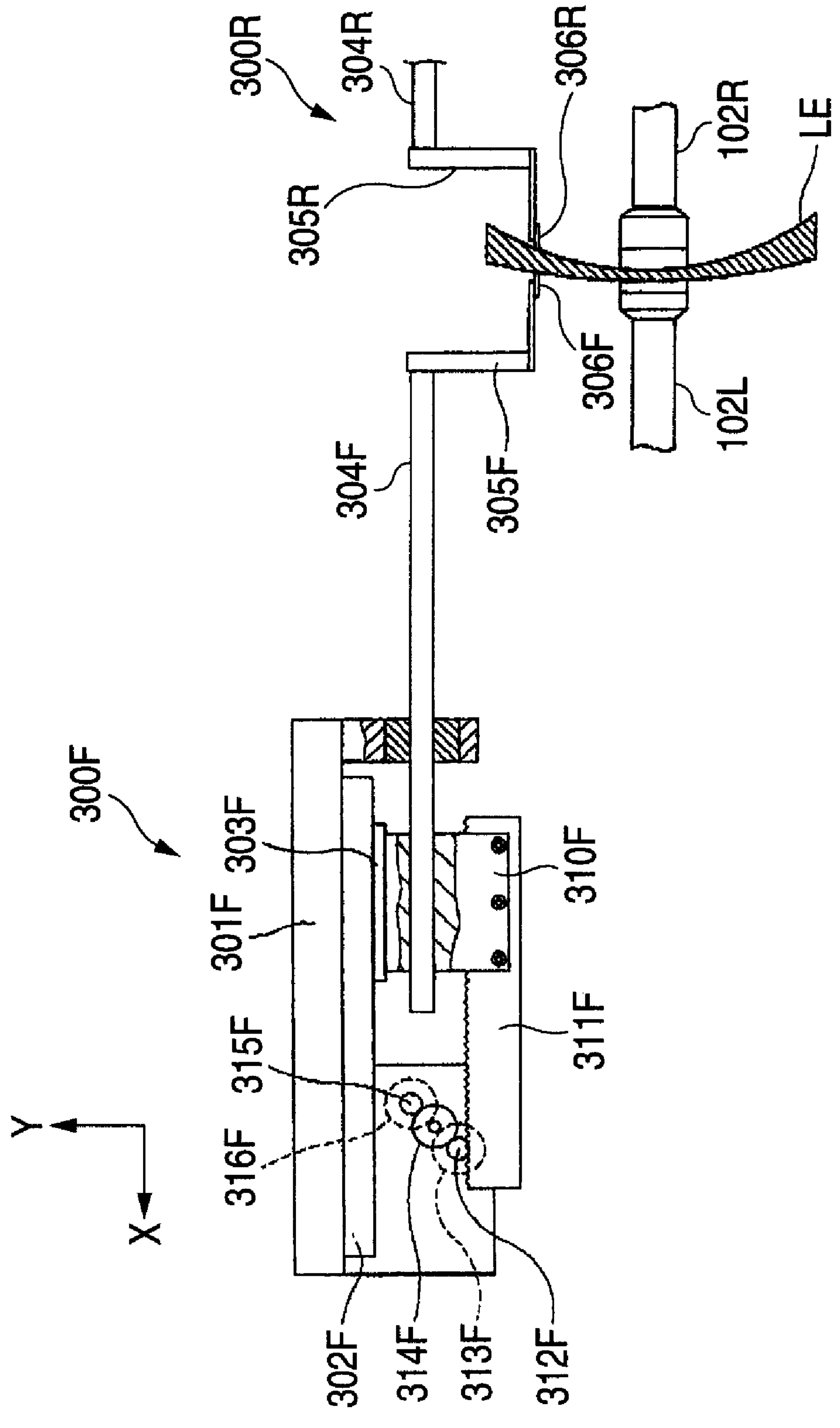
FIG. 3 is an explanatory view of a constitution of a lens measuring portion.

Lens measuring portions 300F and 300R are arranged on the carriage portion 100. FIG. 3 is an outline constitution view of the lens measuring portion 300F for measuring a front surface shape (front edge path after having been finished) of the lens LE. A guide rail 302F extended in the X axis direction is fixed to a fixed support base 301F fixed to a stand 180 on the base 170, and a slider 303F fixed with a moving support base 310F is movably supported on the guide rail 302F. The support base 310F is fixed with a measuring piece arm 304F, a front end of the arm 304F is fixed with a measuring piece hand 305F in an L-like shaper and a front end of the hand 305F is attached with a measuring piece 306F in a shape of a circular plate. When a shape of the front surface of the lens LE is measured, the measuring piece 306F is brought into contact with the front surface of the lens LE.

A lower portion of the support base 310F is fixed with a rack gear 311F, and a gear 312F attached to a rotating shaft of an encoder 313F fixed to the support base 301F is brought in mesh with the rack gear 311F. Further, the support base 301F is fixed with a lens measuring motor 316F, rotation of the motor 316F is transmitted to the rack gear 311F by way of a gear 315F and a gear 314F and the gear 312F, and the rack gear 311F, the support base 310F, the arm 304F and the like are moved in the X axis direction. In measuring, the motor 316F presses the measuring piece 306F to the front surface of the lens LE always by a constant force. The encoder 313F detects an amount of moving the support base 310F and the like (position of measuring piece 306F). The shape of the front surface of the lens LE is measured by the moving amount (position) and an angle of rotating the lens chucks 102L and 102R.

Further, the lens measuring portion 300R for measuring a shape of a rear surface of the lens LE (rear edge path after having been finished) is symmetrical with the lens measuring portion 300F in a left and right direction, and therefore, an explanation of the constitution will be omitted.

An operation of measuring the lens will simply be explained. The measuring piece 306F is brought into contact with the front surface of the lens. The measuring piece 306R is brought into contact with the rear surface of the lens along therewith. The carriage 101 is moved in the Y axis direction based on a target lens shape data under the state, and the lens LE is rotated to thereby simultaneously measure data of the front surface of the lens and the rear surface of the lens. The lens is measured at a position after having been finished, and a position on an inner side or an outer side thereof by a predetermined distance (for example, 1 mm). Thereby, angles of inclination of vicinities of edge positions after having been finished are calculated respectively for the front surface of the lens and the rear surface of the lens.

Figure 4:
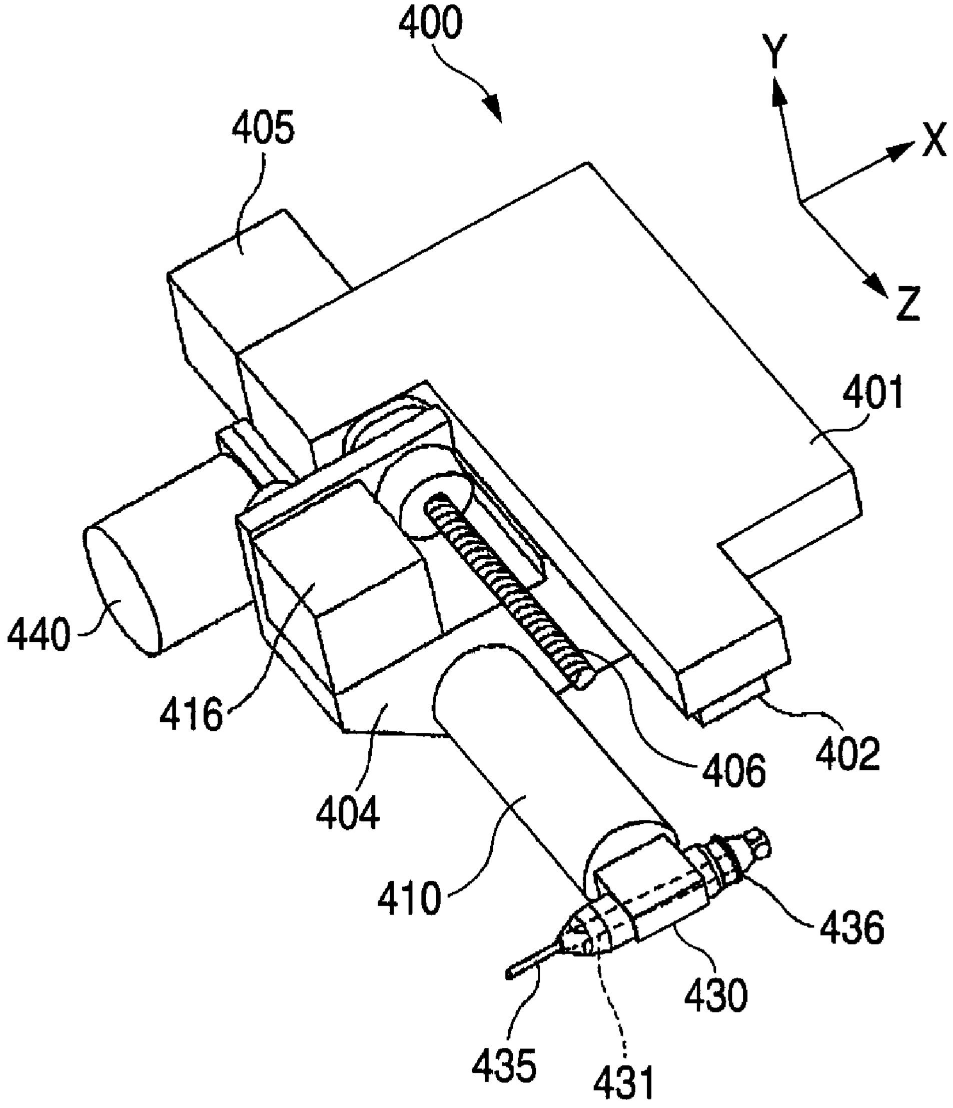
FIG. 4 is an explanatory view of a constitution of a drilling and grooving portion.

A drilling and grooving portion 400 is arranged on a rear side of the carriage 100. FIG. 4 is an outline constitution view of the portion 400. A fixed support base 401 constituting a base of the portion 400 is fixed to a block (not illustrated) provided at the base 170. The fixed support base 401 is fixed with a rail 402 extended in a Z direction (direction orthogonal to XY axes plane). Further, a Z axis moving support base 404 is slidably attached along the rail 402. Further, a Z axis moving support base 404 is slidably attached along the rail 402. The moving support base 404 is moved in the Z axis direction by rotating a ball screw 406 by a motor 405. A rotating support base 410 is rotatably held by the moving support base 404. The rotating support base 410 is rotated around an axis thereof by a motor 416 by way of a rotation transmitting mechanism.

A front end portion of the rotating support base 410 is attached with a rotating portion 430. A rotating shaft 431 orthogonal to an axial direction of the rotating support base 410 is rotatably held by the rotating portion 430. One end of the rotating shaft 431 is coaxially attached with an end mill 435 constituting a drilling tool. Further, other end of the rotating shaft 431 is coaxially attached with a groove cutter 436 constituting a grooving piece. The rotating shaft 431 is rotated by a motor 440. The motor 440 is attached to the moving support base 404 by way of a rotation transmitting mechanism arranged at inner portions of the rotating portion 430 and the rotating support base 410.

Further, structures of the carriage portion 100, the lens measuring portion 300F and 300R and the drilling and grooving portion 400 are basically similar to those described in U.S. Pat. No. 6,790,124 (JP-A-2003-145328). Further, a structure of the chamfering portion 200 is basically similar to that described in U.S. Pat. No. 6,478,657 (JP-A-2001-18155).

Figure 5:
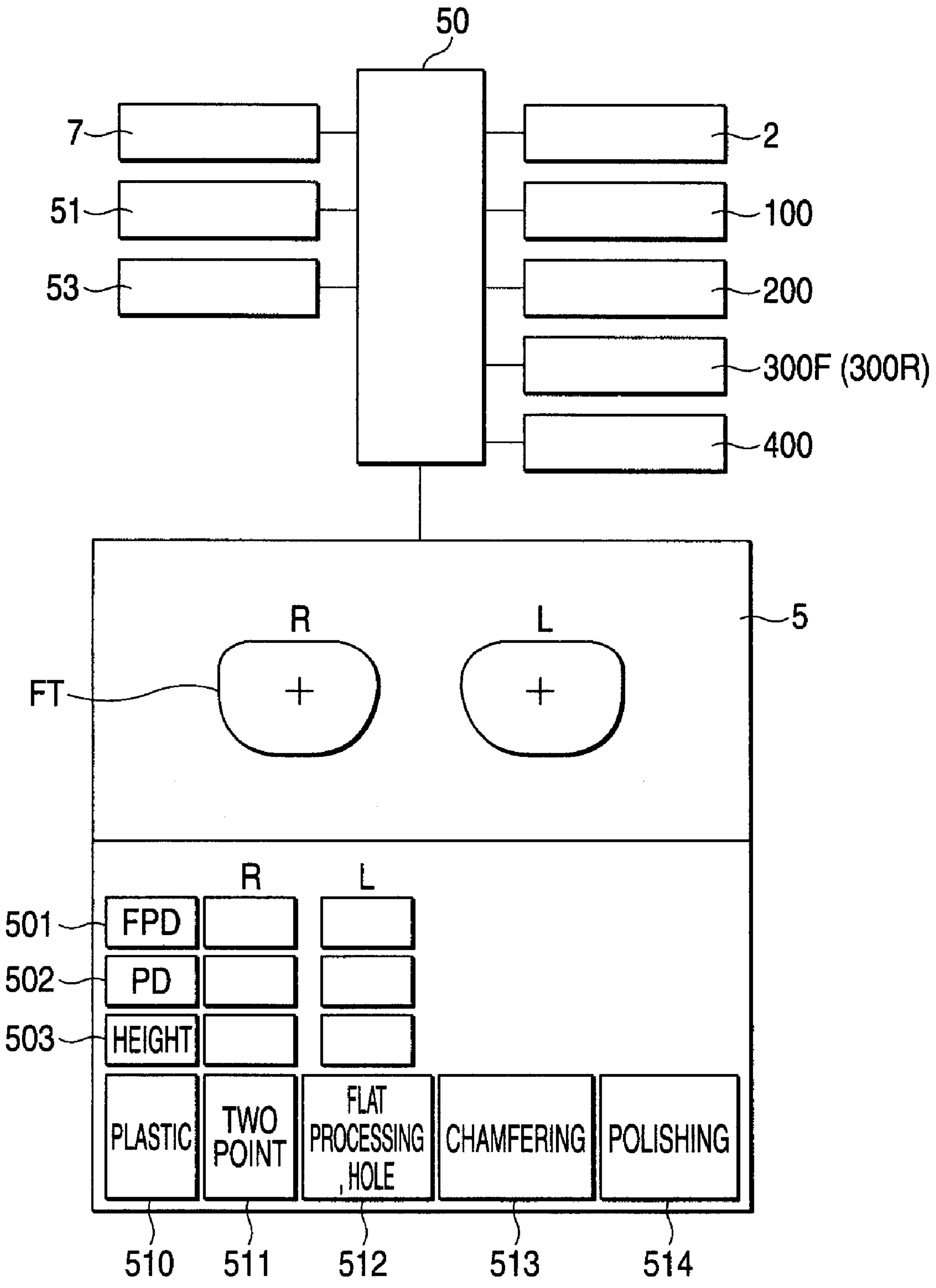
FIG. 5 is a control block diagram of an eyeglass lens processing apparatus.

FIG. 5 is a control block diagram of an eyeglass lens processing apparatus. A control portion 50 is connected with an eyeglass frame measuring apparatus 2 (apparatus described in U.S. Pat. No. 5,333,412 (JP-A-4-93164) can be used), a display 5 constituting a display portion and an input portion of a touch panel type, a switch portion 7, a memory 51, the carriage portion 100, the chamfering portion 200, the lens measuring portions 300F and 300R, the portion 400 and the like. An input signal to the apparatus can be inputted by touching the display of the display 5 by a touch pen (or the finger). The control portion 50 receives the input signal by a touch panel function provided to the display 5 and controls to display diagrams and information of the display 5. Further, the control portion 50 is connected with a grinding water supply portion 53 for supplying grinding water to the processing surface of the lens when the peripheral edge of the lens LE is processed The operation of the apparatus having the above-described constitution will be explained. Here, an explanation will be given centering on boring. In a case of a rimless frame, a target lens shape is provided from a template or a demo lens. The target lens shape data provided by the eyeglass frame measuring apparatus 2 is stored to the memory 51 by pushing the switch portion 7. The display 5 is displayed with a target lens shape diagram FT to be brought into a state of capable of inputting a processing condition. An operator is brought into a state of capable of inputting a layout data of a frame pupillary distance (FPD), a pupillary distance (PD) of the wearer, a height of a lens optical center relative to a geometrical center of the target lens shape by operating predetermined button keys 501, 502, 503 and the like (refer to FIG. 5).

Further, the processing condition is set by operating button keys 510, 511, 512, 513, 514. A material of the lens (plastic, polycarbonate or the like) is selected by the button key 510. Metal, cell, nylol, two points are selected as kinds of the eyeglass frame by the button key 511. Presence/absence of chamfering is selected by the button key 513, and in a case of presence of chamfering, a size of chamfering is selected. Presence/absence of polishing is selected by the button key 514.

An input screen will be explained with reference to FIG. 5. When two points is selected by the button key 511, a flat processing mode is set as a mode of processing a peripheral edge of the lens. Also a drilling mode is set along therewith. In the drilling mode, a data with regard to the drilling is made to be able to be inputted by a hole editing screen displayed by pushing the button key 512.

Figure 6:
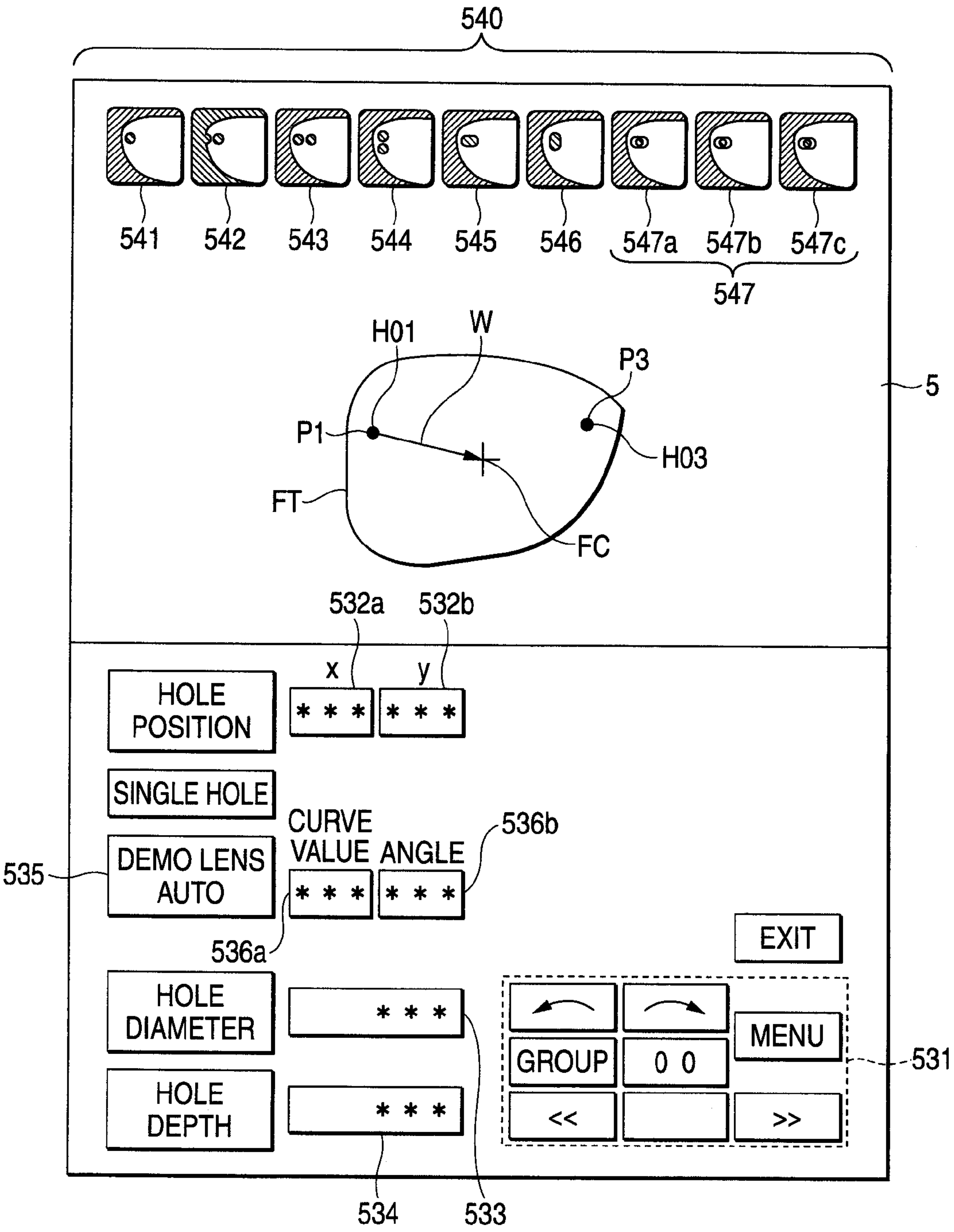
FIG. 6 shows an example of a hole editing screen.

An example of the hole editing screen will be explained with reference to FIG. 6. A template icon group 540 is prepared in advance with a number of fixed holes for a patterned rimless frame. For example, an icon 541 is a template of one hole (single hole) type. An icon 542 is a template combined with a notch and a single hole. An icon 543 is a template of two holes aligned in two in a horizontal direction. An icon 544 is a template aligned with two holes in a vertical direction.

Icons 545, 546 are respectively templates of long holes in the horizontal direction, in the vertical direction. Icons 547*a*, 547*b*, 547*c* are templates of single holes having counterbore. Here, according to the icons 547*a*, 547*b*, 547*c*, data of hole diameters of through holes, hole diameters and hole depths of counterbores are respectively set and registered previously on a side of the operator. The operator can set the data in correspondence with the icons 547*a* through 547*c* in accordance with sizes of screws or washers utilized frequently (details thereof will be described later). Thereby, when the single hole having the spot facing is processed, the operator can save time and labor of inputting or changing the data of the hole diameters of the through holes, the hole diameters and the hole depths of the counterbores.

The operator selects the icon in correspondence with the hole of the rimless frame from the icon group 540. Here, a case in which the rimless frame is constituted by one hole will be explained. At this occasion, the operator selects the icon 541 by a touch pen and thereafter drags the icon 541 to a desired position on the target lens shape diagram FT displayed on the display 5. Thereby, a hole H01 is set. Also a through hole H03 on the nose side can similarly be set. When a hole position is finely adjusted, after designating a hole number or a group by a button key 531, values of x axis data column 532*a* and a y axis data column 532*b* may be changed. Thereby, positions relative to a target lens type center FC can respectively be changed. The hole position can also be inputted as a distance from an edge of the lens. Further, the position of the processed hole can also be determined from a hole position of a demo lens DLE. A hole position data of the demo lens can be acquired by taking an image of the demo lens placed on a lens table by an image taking camera of CCD or the like and measuring the hole position relative to a geometrical center of the target lens shape.

The hole diameter is inputted by an input column 533 and the hole depth is inputted by an input column 534. When the respective input columns are pushed, numerical keypad are displayed, and therefore, the operator can input numerical values thereby.

Figure 7:
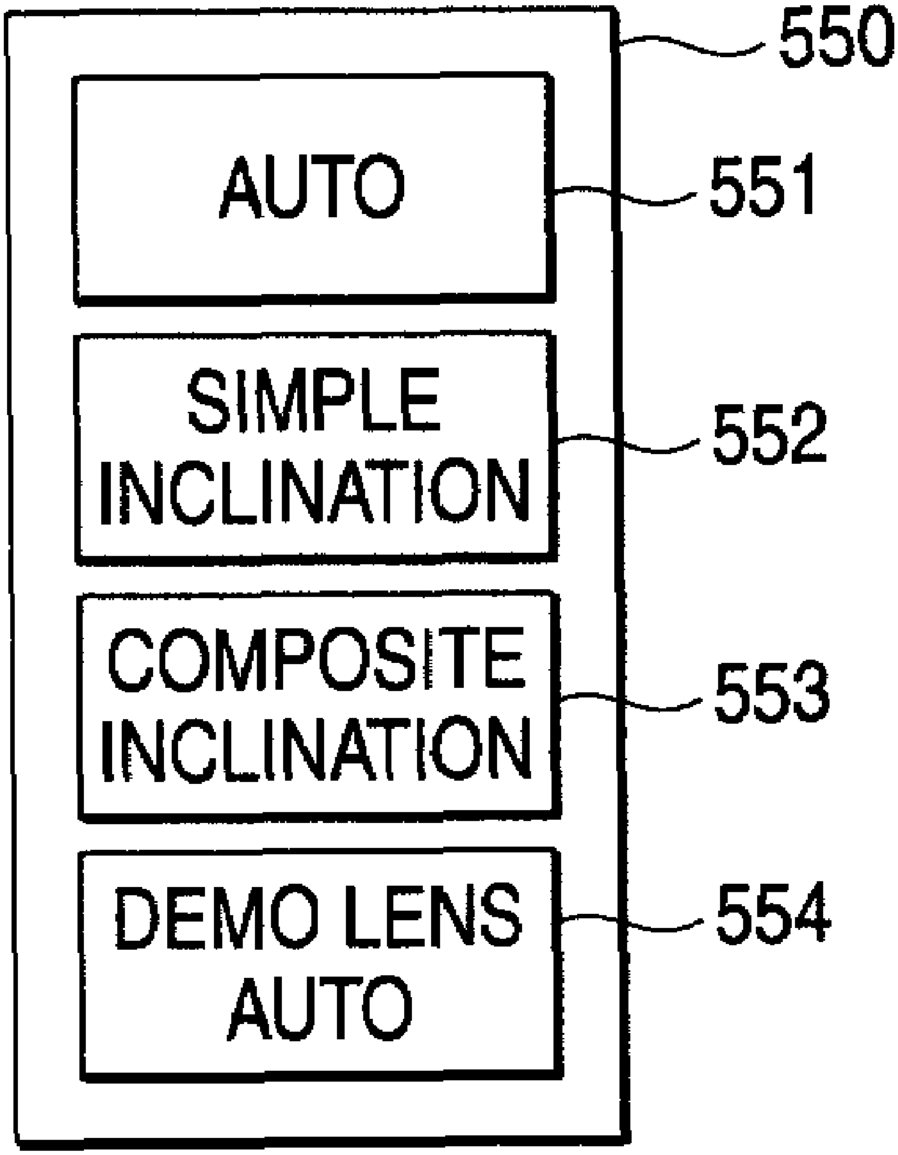
FIG. 7 is a view of a menu of selecting a hole angle setting mode.

With regard to a hole angler when a hole angle setting mode selecting button key 535 is pushed, a hole angle setting mode selecting menu 550 is popped up to display (refer to FIG. 7). When an auto button 551 is selected, the hole angle is automatically set to be orthogonal to a lens surface of the hole position (normal line direction). When a simple inclination button 552 is selected, the angle of the hole can arbitrarily be set. When a composite inclination button 553 is selected, angles of inclination in x axis (horizontal) direction and y axis (vertical) direction can respectively be set arbitrarily. 0° signifies to be in parallel with a chuck axis. Further, when a demo lens auto button 554 is pushed, a hole angle orthogonal (normal line direction) to the lens surface of the hole portion in the demo lens attached to the rimless frame is set. Here, a case of selecting the demo lens auto button 554 will be explained. When the button 554 is selected, as shown by FIG. 6, at a side of the selecting button key 535, a column 536*a* of inputting a curve value of the demo lens is displayed and a hole angle (angle in direction directed to lens chucks 102L and 102R) calculated by inputting the curve value of the demo lens is displayed on a display column 536*b*.

Figure 8A:
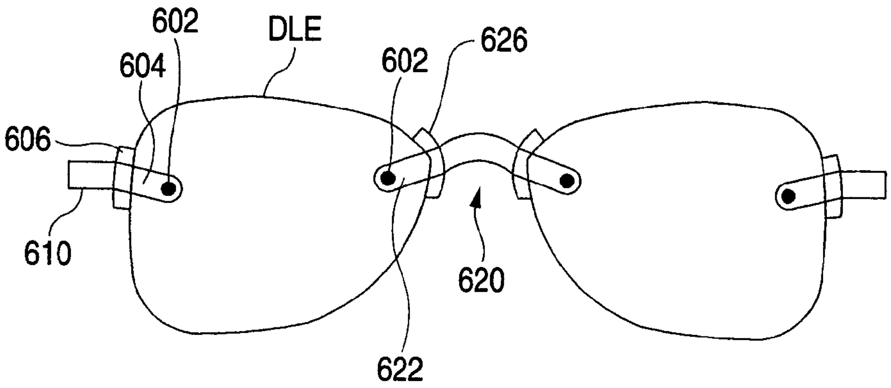
FIG. 8A through FIG. 8D are a front view of a state of attaching a demo lens, sectional views of the demo lens and a sectional view when a processed lens is attached in a rimless frame having a contact portion of one hole.
Figure 8B:
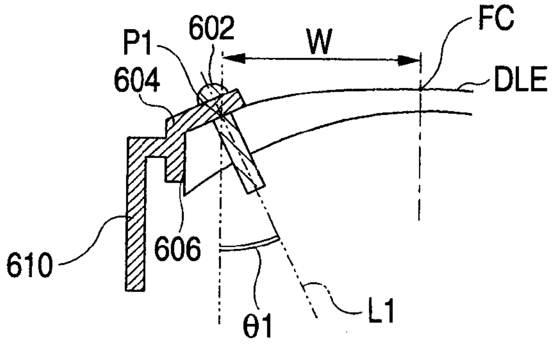

An explanation will be given of inputting the curve value of the demo lens and setting the hole angle in accordance with the surface curve of the demo lens. FIG. 8A shows a front view of a state of attaching the demo lens DLE in a rimless frame of one hole having a turning preventive contact portion at a lens end surface. FIG. 8B is a partial sectional view of the frame on the ear side and the demo lens. In the rimless frame having one hole and the contact portion, an end piece 604 constituting a member of connecting the rimless frame is fixed to a hole opened at the demo lens DLE by using one screw 602. Further, a contact portion 606 bent from the endpiece 604 to the ear side is fixed to be brought into contact with an end surface portion of the demo lens DLE. Further, a temple 610 is extended from the contact portion 606. By bringing the contact portion 606 into contact with the end surface portion of the demo lens DLE, the frame from the endpiece 604 to the temple 610 is prevented from being turned. Also a bridge 620 of the nose side portion is similarly provided with a connecting member 622 in correspondence with the endpiece 604 and a contact portion 626. Further, the bridge 620 is fixed to the hole formed at the demo lens DLE by the screw 602.

In FIG. 8B, the demo lens DLE is bored with the hole in a direction of a normal line L1 of a front surface of the demo lens DLE at a position P1 at a distance W from the target lens center FC. Further, assume that the demo lens DLE is fixed by the screw 602. An angle of the normal line E1 relative to the lens chucks 102L and 102R is designated by notation θ1. Assume that the demo lens DLE having the surface curve, for example, of a curve value C of 4 curve is attached. Normally, when the hole is opened orthogonally to the lens surface (normal line direction), a state of bringing the endpiece 604 into contact with the lens surface is easy to be stabilized. Therefore, there is frequently a case of opening the hole in the normal direction relative to the lens surface in the demo lens. Further, the curve value expressing the lens curve customarily is indicated by a numerical value constituted by dividing 523 by a radius (mm) of the curve.

Figure 8C:
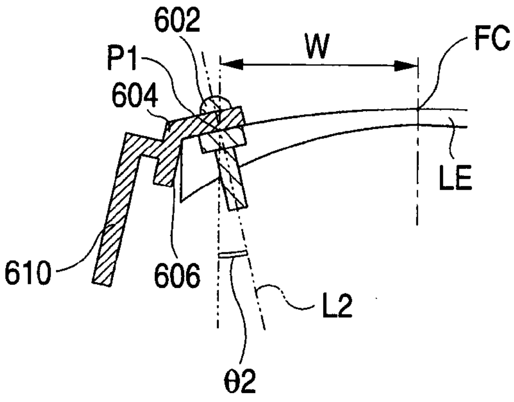

FIG. 8C partially shows a sectional view of a state of the rimless frame shown in FIG. 8A being attached to the prescribed lens LE. The example shows a case in which the curve value of the surface of the lens LE is 1.0 curve, and a hole is bored in a direction of a normal line L2 of a lens surface at the position P1 the same that of the demo lens DLE. An angle of the normal line L2 relative to the lens chucks 102L and 102R is θ2. In a case in which surface curves of the demo lens DLE and the processed lens LE differ from each other, when the processed lens LE is processed with the hole in the direction of the normal line L2 of the surface curve, as shown by FIG. 8C, an opening angle of the temple 610 is increased. In this case, it is extremely difficult to adjust the contact portion 606 related to adjusting the opening angle of the temple 610 and the degree of fitting the endpiece 604.

Figure 8D:
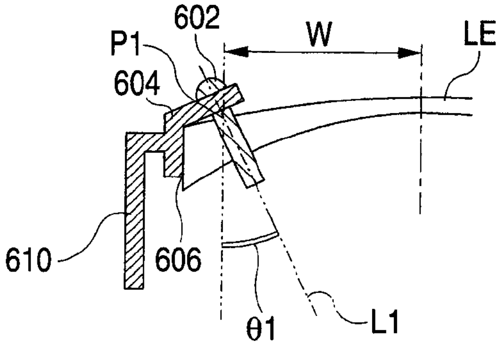

A countermeasure thereagainst will be explained. The operator previously adjusts the opening angle or the like of the temple 610 in a state of the demo lens DLE being attached to the rimless frame. Further, with regard to the drilling of the prescribed processed lens LE, as shown by FIG. 8D, the hole angle is set to θ1 in the case of the demo lens DLE. Thereby, the operator may carry out when the frame is mounted to the demo lens. Therefore, labor of adjusting after finishing to process the lens can be reduced.

Figure 9:
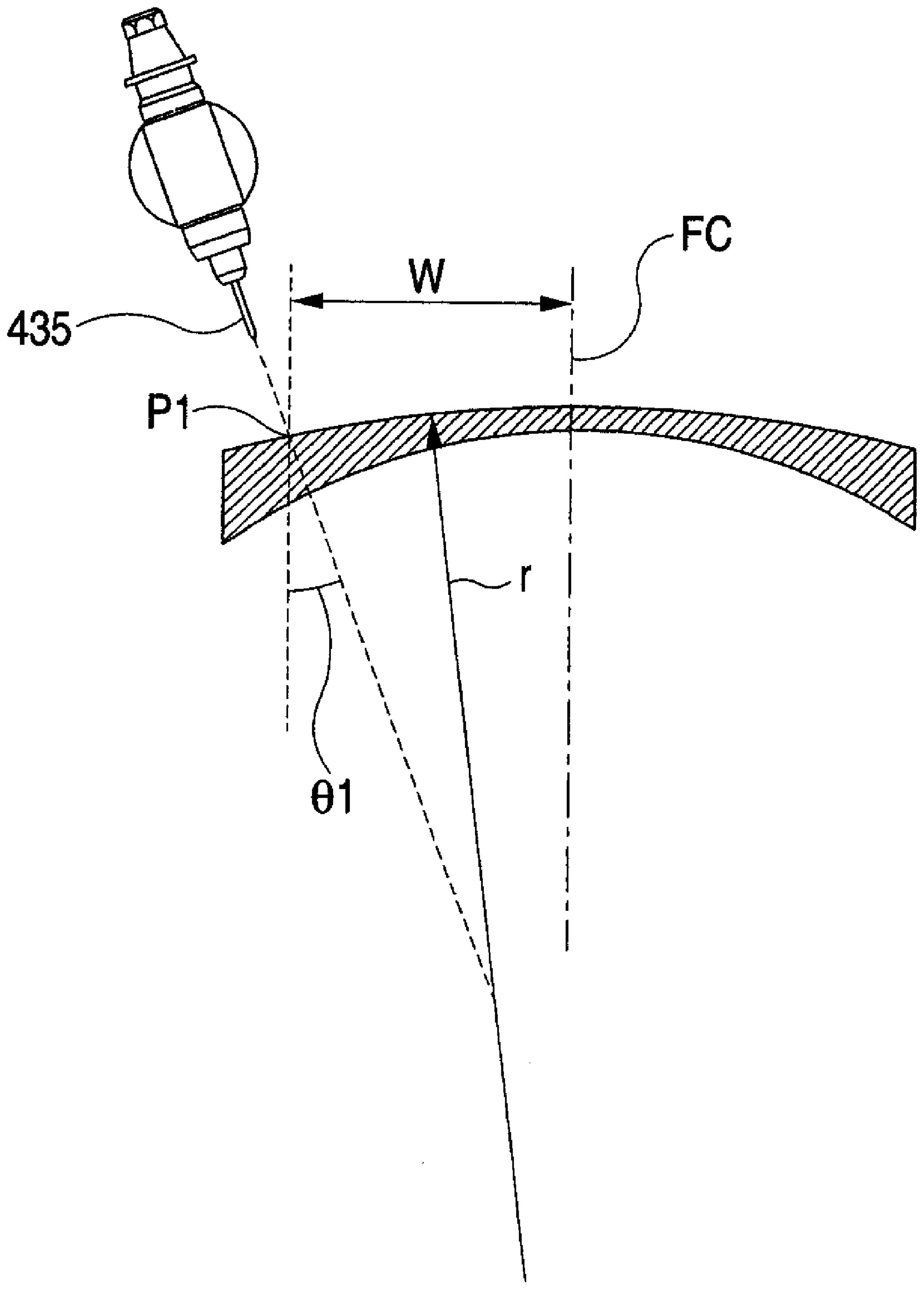
FIG. 9 is a view for explaining a method of boring a processed lens.

A method of making a direction of boring the processed lens LE the same as that of the case of the demo lens DLE as shown by FIG. 8D will be explained ((refer to FIG. 9). First, the operator measures the curve value C of the surface of the demo lens attached to the rimless frame by a well-known curve meter. Further, the measured curve value C is inputted to the input column 536*a* (refer to FIG. 6). The curve value can be inputted by using numerical keypad displayed by touching the input column 536*a*.

When the curve value C is inputted, the control portion 50 calculates a radius of curvature r (mm) of the front surface curve by substituting the curve value C for the following equation.

$$r=523/C$$

Further, the control portion 50 calculates the distance W between the target lens shape center FC and the boring position P1 (distance on plane of target lens shape) based on the input data of the hole position (refer to FIG. 6) Further, the control portion 50 calculates the hole angle θ1 by substituting the radius of the curvature r (mm) and the distance W (mm) for the following equation.

$$\theta 1=\sin^{-1}(W/r)$$

The hole angle θ1 calculated based on the curve value C of the surface of the demo lens is displayed on the display column 536*b*. Thereby, even when curves of the demo lens and the actually processed lens differ from each other, the hole angle θ1 in accordance with the curve value of the demo lens is pertinently set. The operator confirms the angle of the display column 536*b*. Further, when fine adjustment is needed, the angle can be adjusted by numerical keypad displayed by pushing the display column 536*b*.

Although in the above-described, the curve value C customarily used is explained as the value inputted to the input column 536*a*, the value with regard to the lens surface curve can be also used. For example, when the radius of curvature r of the surface curve is known, the radius of curvature r may be used. Further, with regard to the curve value C or the radius of curvature r of the demo lens, when the data formed by a frame maker is attached, the data may be used.

Next, processing the lens will be explained. The operator holds the unprocessed lens LE by the chuck 102R and 102L and thereafter operates the apparatus by pushing a start switch of the switch portion 7. Further, the portions 300F and 300R are operated by controlling of the control portion 50, and the positions of the end surfaces of the lens front surface and the lens rear surface are measured based on the target lens shape data. Further, the end surface positions of the lens surfaces of the hole positions P1, P3 are measured based on the hole position data. Further, the angles of inclination of the lens surfaces at the hole positions P1, P3 are calculated by respectively measuring positions on the outer side or the inner side of the hole positions P1, P3 by predetermined amounts. The difference in the surface curves can be locally approximated to the difference in the angles of inclination. Incidentally, the same is true of the demo lens. Therefore, instead of inputting the curve value C of the demo lens, the angles of inclination in the vicinity of the hole position may be input.

When the lens shape has been finished to measure, successively, the lens peripheral edge is processed. By moving the carriage 101 in the X axis direction, the lens LE is placed on the roughing grindstone 162*a*. Further, by moving the carriage 101 in the Y axis direction based on the target lens shape data, the peripheral edge of the lens LE is roughed. Next, the lens LE is moved on the flat portion of the finishing grindstone 162*b*. Further, by moving the carriage 101 in the Y axis direction based on the finishing data, the peripheral edge of the lens LE is finished to be flat.

When the lens peripheral edge has been finished to process, the processing portion 400 is driven and the rotating portion 430 is placed at a processing position. Thereafter, the rotating support base 410 is rotated by the motor 416 and an axial direction of the end mill 435 is set to the hole angle θ1. Next, the carriage 101 is controlled to move simultaneously in the X axis direction and the Y axis direction based on the hole position data. Along therewith, the lens LE held by the chucks 102R and 102L is moved in the direction of the hole angle θ1 relative to the end mill 435, and the hole H01 is processed by the end mill 435. Further, in the drilling, instead of moving the lens LE, there may be constructed a constitution of moving the side of the end mill 435 in the direction of the hole angle θ1.

As described above, even when the curves of the demo lens and the actually processed lens differ from each other, the hole angle θ1 in accordance with the curve value of the demo lens is pertinently set. Further, the set hole angle θ1 is displayed on the display column 536*b*, and therefore, fine adjustment of the hole angle can easily be carried out.

In the above-described, with regard to the boring position, the position P1 acquired from the hole position of the demo lens DLE is used as it is. However, further preferably, when the surface curve of the demo lens DLE and the surface curve of the processed lens LE differ from each other, the position of the actually processed hole may be corrected.

Figure 10A:
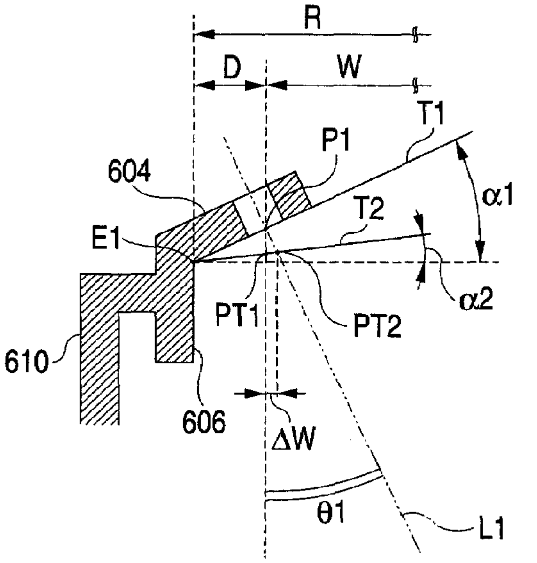
FIG. 10A through FIG. 10B are views for explaining correction of a position of a hole.

FIG. 10A is a sectional view further enlarging FIG. 8B and FIG. 8D mentioned above. In FIG. 10A, an angle of inclination α1 indicates an angle of a surface T1 of the demo lens DLE. An angle of inclination α2 indicates an angle of a surface T2 of the processed lens LE. In a case in which it is conceived to bring an edge side surface E1 of the lens LE into contact with the contact portion 606, when data of the hole position P1 of the demo lens DLE is used as it is, the hole position becomes PT1. When the hole is opened in a direction the same as that of the hole angle θ1 of the demo lens DLE, an intersection of the normal line L1 passing the hole center of the endpiece 604 and the surface T2 of the lens LE becomes PT2. In this case, a shift amount ΔW is produced between the position PT1 and the position PT2. In this case, when the hole is processed at the position PT2 corrected from the hole position P1 by the amount ΔW, in integrating the rimless frame, the side surface E1 of the end portion of the lens LE and the contact portion 606 can be matched and adjustment is inconsiderable.

In FIG. 10A, a distance D between the end portion side surface E1 and the hole position P1 (PT1) is calculated by the fact that a radius vector length R of the target lens shape is already known. The angle of inclinational α1 of the surface of the demo lens DLE is calculated from the distance W since a radius of curvature r is known from the curve value of the demo lens DLE (the same as angle θ1). There is used the angle of inclination α2 of the surface of the processed lens LE which is approximately measured as an angle of inclination at the hole position P1. Thereby, the correction amount ΔW can be calculated geometrically. When the correction amount ΔW is provided, the hole position of the actually processed lens LE can be corrected relative to the hole position P1 based thereon.

Further, in calculation of the correction amount ΔW in FIG. 10A, the angles of inclination α1, α2 at vicinities of the hole position P1 are approximately calculated. The correction amount ΔW is confined to an extremely small deviation in actual processing, and therefore, the practical problem is inconsiderable. At least, an adjustment amount in integrating the rimless frame is inconsiderable in comparison with that before correction.

Figure 10B:
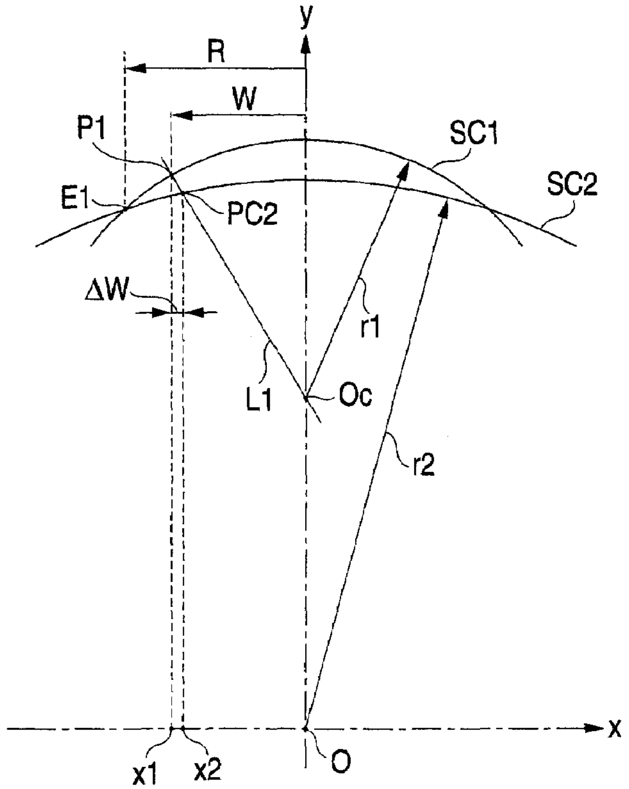

As shown by FIG. 10B, the correction amount ΔW can be calculated also by using a surface curve radius r1 of the demo lens DLE and a surface curve radius r2 of the processed lens LE. In FIG. 10B there is shown an xy coordinates system constituting an original point by center coordinates O of a circle SC2 having the surface curve radius r2 of the lens LE (there is used the xy coordinates system different from coordinates system of the hole position data input of FIG. 6). With regard to a circle SC1 having the surface curve radius r1 of the demo lens DLE, a center Oc thereof is arranged on the y axis. In this case, the y axis constitutes a center of the target lens shape, and the center Oc is arranged on the y axis such that the circle SC1 and the circle SC2 overlap each other at the point E1 of the radius vector length R of the target lens shape data. Further, the normal line L1 connecting the hole position P1 of the demo lens (point P1 on circle SC1) designated by the distance W from the y axis in the x axis direction and the center Oc is set. An intersection PC2 of the normal line L1 and the circle SC2 is calculated. From FIG. 10B, a difference between x coordinates of the point P1 and the point PC2 (respectively, x1, x2) is provided as the correction amount ΔW. Further, the radius r2 is calculated based on the curve value of the lens LE. The curve value of the lens LE can be inputted by an input screen similar to FIG. 6.

An explanation will be given of a case of finely adjusting the hole by confirming an attaching hole. For example, assume that in order to confirm the hole angle with regard to the hole H01, first, a prepared hole is processed by a hole diameter 0.8 mm (diameter of the end mill 435), thereafter, a regular hole is opened by a hole diameter 1.2 mm. When the lens peripheral edge and the prepared hole are processed, the operator detaches the processed lens LE from the chucks 102R and 102L. Further, the operator checks whether an angle, a hole position and the like of the prepared hole adapt to the frame. Thereafter, the lens LE is chucked to the chucks 102R and 102L again. When a retouch switch arranged at the switch portion 7 is pushed, there is brought about a mode of carrying out reprocessing and a menu is displayed on the display 5. On a hole editing screen of the reprocessing mode, the hole angle θ1 of the display column 536*b* is called and displayed. When the display column 536*b* is pushed, numerical keypad are displayed, and a value of the hole angle is made to be able to be corrected. Further, values of the input column 533 of the hole diameter, the x axis data column 532*a* and the y axis data column 532*b* of the hole position data are made to be able to be corrected. After inputting the correction data, when the processing start switch is pushed again, movements of the portion 400 and the carriage 101 are controlled by the control portion 50 to process the corrected portion.

Figure 11:
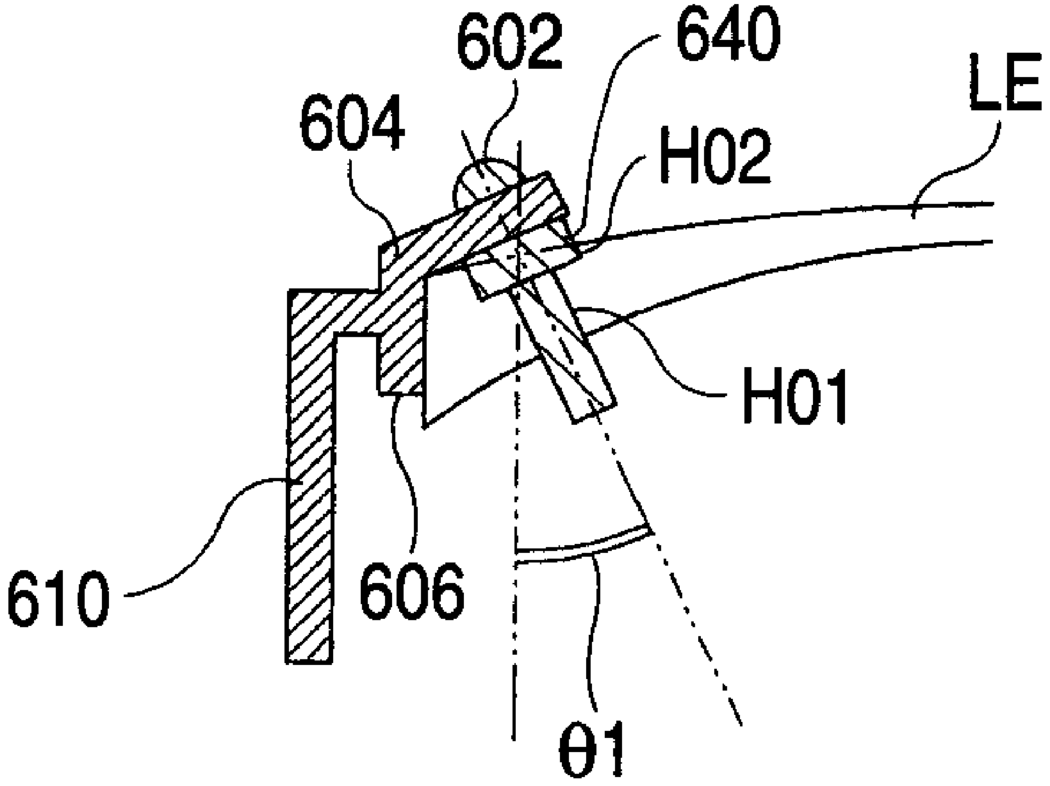
FIG. 11 is a view for explaining an example for arranging a flat washer between a front surface of a lens and an endpiece.

In the drilling as explained above, as shown by FIG. 8D, when the hole is processed in a direction different from the normal line direction of the surface curve of the lens LE, the front surface of the lens LE and the surface of the endpiece 604 opposed to each other are not brought into contact with each other uniformly. Therefore, a stability in fastening the screw 602 is deficient and the screw 602 is likely to be loosened in accordance with wearing the eyeglass. In order to deal therewith, as shown by FIG. 11, there is generally adopted a method of arranging a flat washer 640 between the front surface of the lens LE and the endpiece 604. In this case, in order to arrange the washer 640, a counterbore H02 centering on the through hole H01 is needed. According to the counterbore H02, the hole diameter and the hole depth are determined such that a surface of the flat washer 640 on a side of being opposed to the side of the lens LE is uniformly brought into contact with the front surface of the lens LE. The larger the difference between the surface curves of the processed lens LE and the demo lens, the more promoted the effect of providing the washer and the counterbore.

Setting of the counterbore will be explained. When one hole having spot facing is opened, in the hole editing screen shown in FIG. 6, there is a method of setting the hole position and the hole diameter of the hole H01 constituting the through hole, and thereafter, setting the hole position of the hole H02 of the counterbore at the same position. That is, this is a method of individually setting the hole H01 of the through hole and the hole H02 of the counterbore. However, according to the method, an efficiency of the operation is poor and time and labor may be taken for the settings.

Hence, when one hole having spot facing is opened, the operator selects any of the icons 547*a*, 547*b*, 547*c* patterned with combinations of the counterbore and the single hole. An example of the setting in this case will be explained by using an example of the editing screen of FIG. 12. The operator selects one icon from the icon group 540. As an example, a case of selecting the icon 547*a* will be explained. After selecting the icon 547*a* by the touch pen, when the icon 547*a* is dragged to a desired position of the target lens shape diagram FT, the hole H01 of single hole (through hole) and the counterbore H02 having the same center of the hole position are simultaneously set. When the hole position is finely adjusted, after designating the hole number or the group by the button key 531, by changing values of the x axis data column 532*a* and the y axis data column 532*b*, positions relative to the target lens shape center FC are respectively changed. Also in this case, the hole positions of the single hole H01 and the counterbore H02 are simultaneously changed.

Figure 12:
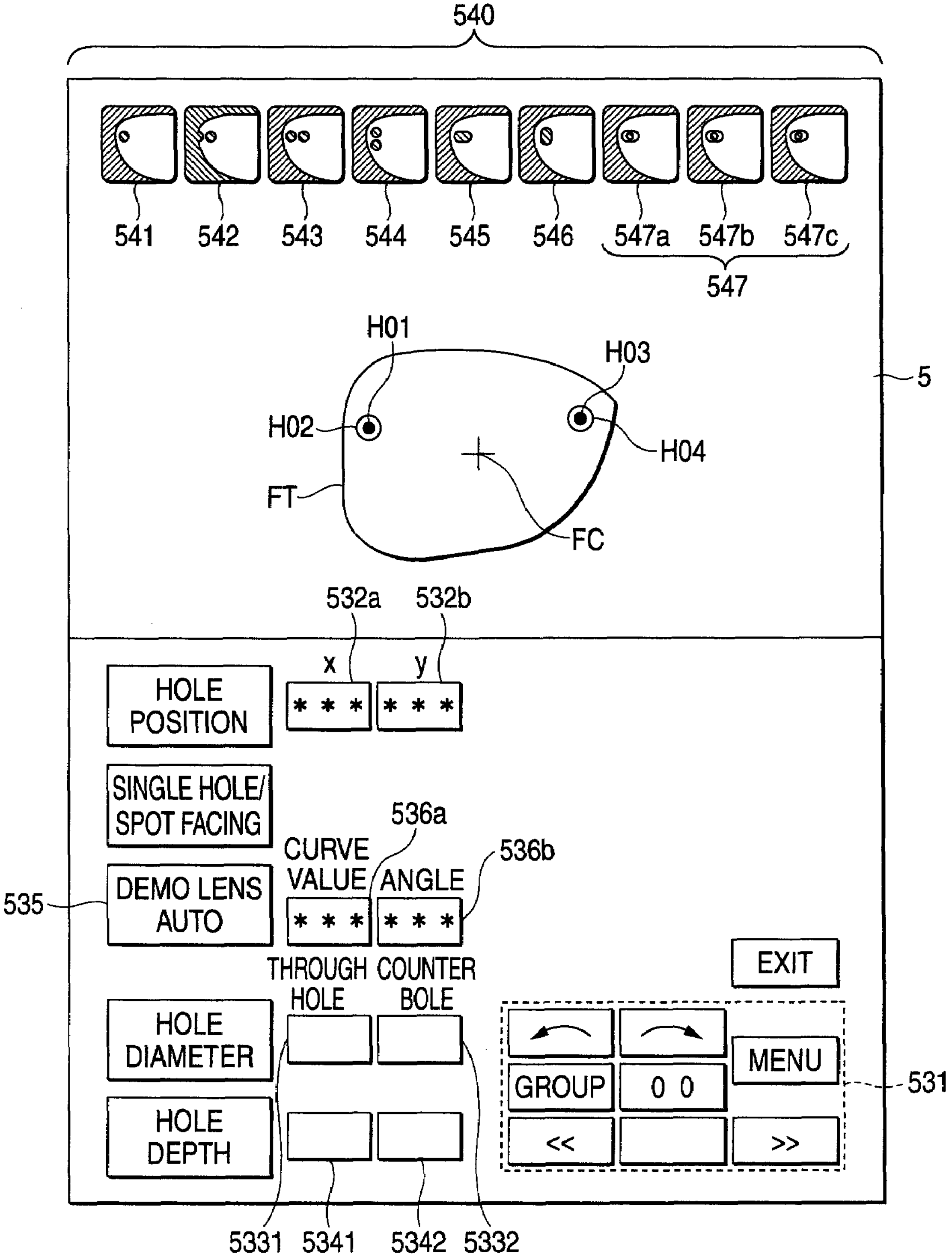
FIG. 12 shows an example of a hole editing screen when a pattern of a combination of a counterbore and a single hole is used.

Further, when a pattern of a combination of a counterbore and a single hole is selected by the icon 547*a*, with regard to the hole H01 and the hole H02, hole diameters and hole depths can simultaneously be set (refer to FIG. 12). That is, the hole diameter of the through hole is made to be able to be inputted by an input column 5331 and the hole diameter of the counterbore is made to be able to be inputted by an input column 5332, respectively. Further, a hole depth data of the counterbore is made to be able to be inputted by an input column 5342. With regard to an input column 5341 of the hole depth data of the hole H01, although in the initial setting, the hole H01 is the through hole, the hole H01 can also be constituted by a hole which is not penetrated by designating the depth. Further, previously set initial values are inputted for the input columns 5331, 5332, 5341 and 5342 by selecting the icon 547*a*. When the initial values are changed, desired values are directly made to be able to be inputted by using numerical keypad displayed by touching the respective input columns. Also a through hole H03, a counterbore H04 on the nose side can similarly be set.

As described above, by using the icons 547*a* through 547*c* patterned with the combinations of the counterbore and the single holes, duplicating settings when the hole positions of the through hole and the counterbore stay the same can be omitted. Furthermore, also the respective hole diameters can be inputted on the same screen, and therefore, the setting of the drilling can efficiently be carried out.

What is claimed is:

1. An eyeglass lens processing method for processing a hole for attaching a rimless frame to an eyeglass lens, the method comprising:

selecting a hole pattern used for a processing from a plurality of hole patterns;

selecting a first drilling in which an angle of the processed hole is normal to a lens surface of a demo lens, a second drilling in which the angle of the processed hole is normal to a lens surface of the eyeglass lens or a third drilling in which the angle of the processed hole is arbitrarily set to the lens surface of the eyeglass lens;

when the first drilling is selected, (a) inputting a surface curve of the demo lens or an angle of inclination, which is approximated to the surface curve of the demo lens, at a hole position, (b) inputting hole position data of the demo lens for the selected hole pattern, (c) determining an hole angle and a hole position for the eyeglass lens based on the surface curve or the angle of the inclination and the hole position data to obtain drilling data; and performing drilling on the eyeglass lens based on the drilling data.

2. The method according to claim 1, wherein the hole position data inputting step includes a step of inputting a surface curve of the eyeglass lens or an angle of inclination, which is approximated to the surface curve of the eyeglass lens, at a hole position, and the determining step includes a step of correcting the hole position data to obtain a hole position correction data when the demo lens differs from the eyeglass lens in the surface curve or the angle of the inclination.

3. The method according to claim 1, wherein the hole position data inputting step includes steps of taking an image of the demo lens and obtaining the hole position based on the taken image.

* * * * *